United States Patent
Walker et al.

(10) Patent No.: US 12,367,145 B2
(45) Date of Patent: Jul. 22, 2025

(54) REMOTE ACCELERATION FOR DATA DEPENDENT ADDRESS CALCULATION

(71) Applicants: Advanced Micro Devices, Inc., Santa Clara, CA (US); Xilinx, Inc., San Jose, CA (US)

(72) Inventors: William L. Walker, Ft Collins, CO (US); Scott Thomas Bingham, Santa Clara, CA (US); Pongstorn Maidee, San Jose, CA (US); William E. Jones, Ft Collins, CO (US); Richard Carlson, Santa Clara, CA (US)

(73) Assignees: Advanced Micro Devices, Inc., Santa Clara, CA (US); Xilinx, Inc., San Jose, CA (US)

( * ) Notice: Subject to any disclaimer, the term of this patent is extended or adjusted under 35 U.S.C. 154(b) by 0 days.

(21) Appl. No.: 18/478,913

(22) Filed: Sep. 29, 2023

(65) Prior Publication Data
US 2025/0110877 A1     Apr. 3, 2025

(51) Int. Cl.
G06F 12/0811     (2016.01)
G06F 12/1027     (2016.01)

(52) U.S. Cl.
CPC ...... *G06F 12/0811* (2013.01); *G06F 12/1027* (2013.01)

(58) Field of Classification Search
None
See application file for complete search history.

(56) References Cited

U.S. PATENT DOCUMENTS

| | | | |
|---|---|---|---|
| 6,269,431 B1 * | 7/2001 | Dunham | G06F 11/1458 714/E11.12 |
| 2010/0017586 A1 | 1/2010 | Gelman et al. | |
| 2016/0179679 A1 * | 6/2016 | Morris | G06F 12/0884 711/137 |
| 2017/0357588 A1 | 12/2017 | Moyer | |
| 2020/0301838 A1 | 9/2020 | Sinha et al. | |
| 2021/0150352 A1 | 5/2021 | Kim | |
| 2021/0349827 A1 | 11/2021 | Chirca et al. | |

FOREIGN PATENT DOCUMENTS

EP     924620 A2 *  6/1999  ......... G06F 13/4059

OTHER PUBLICATIONS

International Search Report and Written Opinion in PCT Application No. PCT/US2024/033879 mailed Oct. 11, 2024, By: Authorized Officer: Jeong Rok Yang (7 Pages).

* cited by examiner

*Primary Examiner* — Brian R Peugh
(74) *Attorney, Agent, or Firm* — Greenberg Traurig, LLP (57) ABSTRACT

The disclosed device includes a processor and an interconnect connecting the processor to a memory. The interconnect includes an interconnect agent that can forward memory requests from the processor to the memory and receive requested data returned by the memory. The requested data can include information for a next memory request such that the interconnect agent can send, to the memory, a speculative memory request using information for the next memory request that was received in response to the memory request. Various other methods, systems, and computer-readable media are also disclosed.

20 Claims, 7 Drawing Sheets

REMOTE ACCELERATION FOR DATA DEPENDENT ADDRESS CALCULATION

BACKGROUND

In computing systems, accessing memory introduces overhead that can present a performance bottleneck. Various techniques seek to reduce this overhead. For example, pre-fetching techniques often include predictions of a next memory address to be read, and pre-emptively sending a memory request for the predicted next memory address (e.g., before sending an actual memory request for the next memory address) in order to pre-fetch the data. Pre-fetching the data can reduce the overhead for retrieving data (e.g., looking up the address, reading out the data, etc.) by having the pre-fetched data queued up for the actual memory request. However, such pre-fetching techniques are not appropriate for certain workloads.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to remote acceleration for data dependent address calculation. As will be explained in greater detail below, implementations of the present disclosure provide an agent along an interconnect between a processor unit and memory that can send speculative memory requests for data dependent address calculation by reading requested data returned by the memory and sending, using information for a next memory request in the requested data, the speculative memory request. The memory can retrieve the next requested data in response to the speculative memory request to reduce an overall time needed for retrieving data dependent loads. Rather than requiring separate full round trips between the processor unit and the memory (e.g., end-to-end routes) for each data dependent memory request, the systems and methods provided herein allow for temporal overlap between consecutive end-to-end routes to reduce an overall time for retrieving data.

In one implementation, a device for remote acceleration for data dependent address calculation includes a processor including a cache, an interconnect for connecting the cache to memory, and an interconnect circuit coupled between the processor and the memory. The interconnect circuit is configured to (i) send, to memory, a memory request received from the at least one processor, (ii) receive requested data returned by the memory in response to the memory request, wherein the requested data includes information for a next memory request, and (iii) send, to the memory, a speculative memory request based on the information for the next memory request that was received in response to the memory request.

In some examples, the processor is configured to identify the memory request as corresponding to a data dependent load that requires information from a preceding request for sending a following request, and send, to the interconnect circuit, a speculative memory request instruction with the memory request, wherein the interconnect circuit sends the speculative memory request in response to receiving the speculative memory request instruction.

In some examples, the speculative memory request instruction includes instructions for calculating, using the information in the requested data, a next memory address for the next memory request. In some examples, identifying the memory request as corresponding to the data dependent load includes recognizing an instruction address load for the memory request. In some examples, the instruction address load corresponds to a linked list or a page table.

In some examples, the interconnect circuit is further configured to receive, from the memory, speculative request data in response to the speculative memory request, and store, in a buffer, the speculative request data. In some examples, the interconnect circuit is further configured to send, to the processor, the speculative request data in response to a second memory request corresponding to the speculative memory request. In some examples, the agent is configured to drop the speculative request data after a timeout period elapses.

In some examples, the requested data includes embedded flags and information for selecting an operation. In some examples, the interconnect circuit is further configured to determine a next operation for the speculative memory request using the requested data and recorded history of previous operations.

In one implementation, a system for remote acceleration for data dependent address calculation includes a processor including a cache, memory, an interconnect for connecting the cache to the memory, and an interconnect circuit coupled between the processor and the memory. The interconnect circuit is configured to (i) receive requested data returned by the memory in response to a memory request from the processor, wherein the requested data includes information for a next memory request and the requested data includes embedded flags for selecting operations, (ii) send, to the processor, the requested data, (iii) determine a next operation using the requested data and recorded history of previous operations, (iv) calculate, using the requested data, a next memory address for the next memory request, and (v) send, to the memory, a speculative memory request based on the next memory address that was received in response to the memory request.

In some examples, the processor is configured to identify the memory request as corresponding to a data dependent load that requires information from a preceding request for sending a following request, and send, to the interconnect circuit with the memory request, a speculative memory request instruction that includes instructions for calculating, using the information in the requested data, the next memory address. In some examples, the interconnect circuit is configured to send the speculative memory request to the memory in response to receiving the speculative memory request instruction.

In some examples, identifying the memory request as corresponding to the data dependent load includes recognizing an instruction address load for the memory request. In some examples, the instruction address load corresponds to a linked list. In some examples, the instruction address load corresponds to a page table. In some examples, the information includes a status flag indicating a last level of a page table walk operation.

In some examples, the memory is configured to retrieve speculative request data in response to the speculative memory request, and store, in a buffer, the speculative request data. In some examples, the memory is further configured to send the speculative request data to the interconnect circuit in response to a second memory request corresponding to the speculative memory request. In some examples, the memory is configured to drop the speculative request data after a timeout period elapses.

In one example, a method for remote acceleration for data dependent address calculation includes (i) identifying a memory request as corresponding to a data dependent load that requires information from a preceding request for sending a following request, (ii) sending, to an interconnect circuit, a speculative memory request instruction with the memory request, wherein the speculative memory request instruction includes instructions for calculating a next memory address using information in requested data for the memory request, (iii) receiving, by the interconnect circuit from memory in response to the memory request, the requested data for the memory request, (iv) determining, by the interconnect circuit in response to the speculative memory request instruction, the next memory address using the information that was received in response to the memory request and an instruction received with the current memory request, (v) sending, by the interconnect circuit to the memory, a speculative memory request based on the next memory address, and (vi) sending, by the interconnect circuit, the requested data.

In some examples, the method further includes retrieving, by the memory, speculative request data in response to the speculative memory request and buffering the speculative request data. In some examples, the method further includes sending the speculative request data in response to a second memory request corresponding to the speculative memory request. In some examples, the method further includes identifying the memory request as corresponding to the data dependent load comprises recognizing an instruction address load for the memory request.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of remote acceleration for data dependent address calculation. Detailed descriptions of an example system will be provided in connection with FIG. 1. Detailed descriptions of example data dependent address calculation will be provided in connection with FIG. 2. Detailed descriptions of example data dependent address calculation with remote acceleration will be provided in connection with FIG. 3. Detailed descriptions of example timelines and flows with respect to data dependency of TLB misses will be provided in connection with FIGS. 4A-4B and 5. Detailed descriptions of corresponding computer-implemented methods will also be provided in connection with FIGS. 6 and 7.

Figure 1:
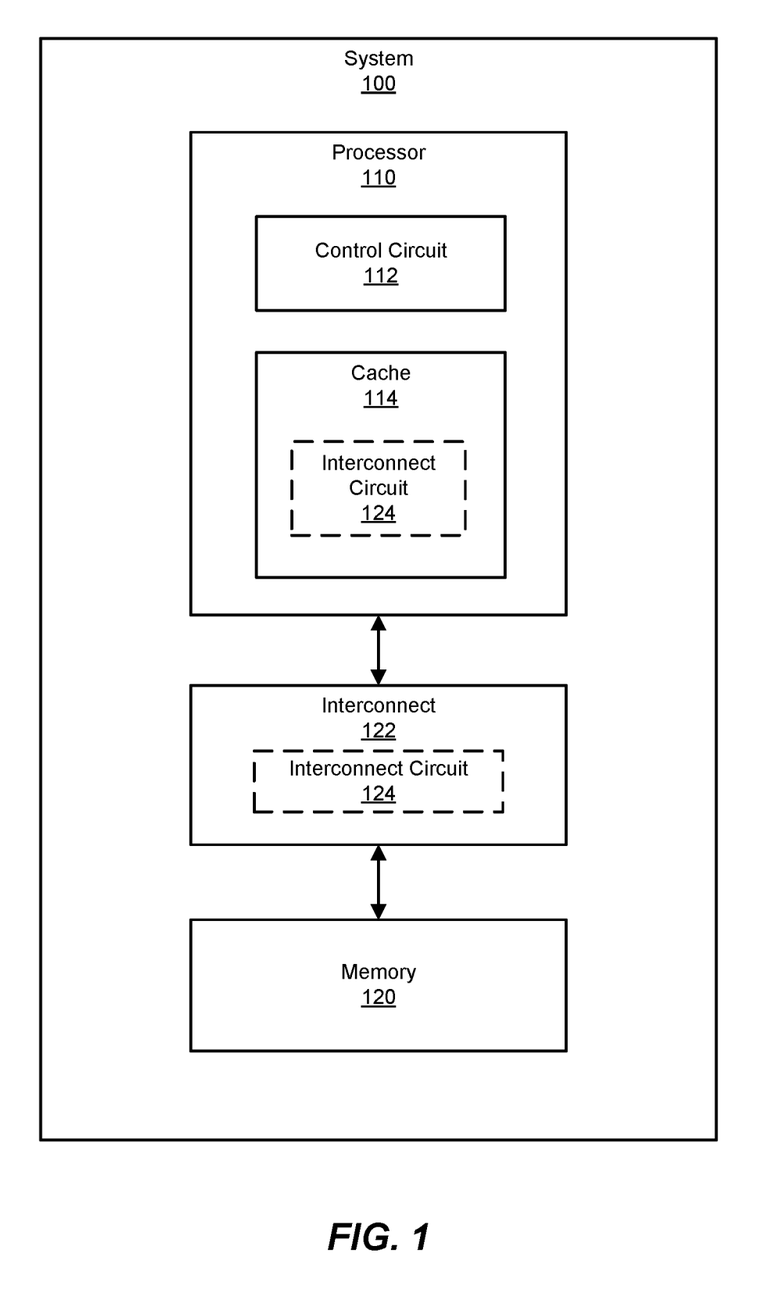
FIG. 1 is a block diagram of an exemplary system for remote acceleration for data dependent address calculation.

FIG. 1 is a block diagram of an example system 100 for remote acceleration of data dependent address calculation. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, chiplets, portions of one or more of the same, variations or combinations of one or more of the same, and/or any other suitable physical processor.

As further illustrated in FIG. 1, processor 110 includes a control circuit 112 and a cache 114. Control circuit 112 corresponds to a circuitry and/or instructions for controlling aspects of processor 110 and in some implementations corresponds to a sub-unit thereof (e.g., a load/store unit, etc.). Cache 114 corresponds to a local memory of processor 110 and in some examples, corresponds to a cache hierarchy.

An interconnect 122 connects processor 110 and memory 120. Interconnect 122 corresponds to circuitry for allowing communication (e.g., sending/receiving memory requests and/or data) between processor 110 and memory 120. In some examples, interconnect 122 includes and/or interfaces with an interconnect circuit 124 (e.g., also referred to as an interconnect agent or agent herein) that corresponds to a controller and/or other circuitry for sending speculative memory requests, as described herein. Interconnect circuit 124 can be located anywhere along a route between processor 110 and memory 120. In some examples, interconnect circuit 124 can be located near cache 114 (e.g., on or physically near processor 110) and in other examples, interconnect circuit 124 can be located near memory 120 (e.g., on or physically near memory 120), and in further examples, interconnect circuit 124 can be part of the cache hierarchy (e.g., in cache 114 as illustrated in FIG. 1). In some examples, multiple iterations of interconnect circuit 124 can be located between processor 110 and memory 120 (e.g., in cache 114 and in interconnect 122).

Figure 2:
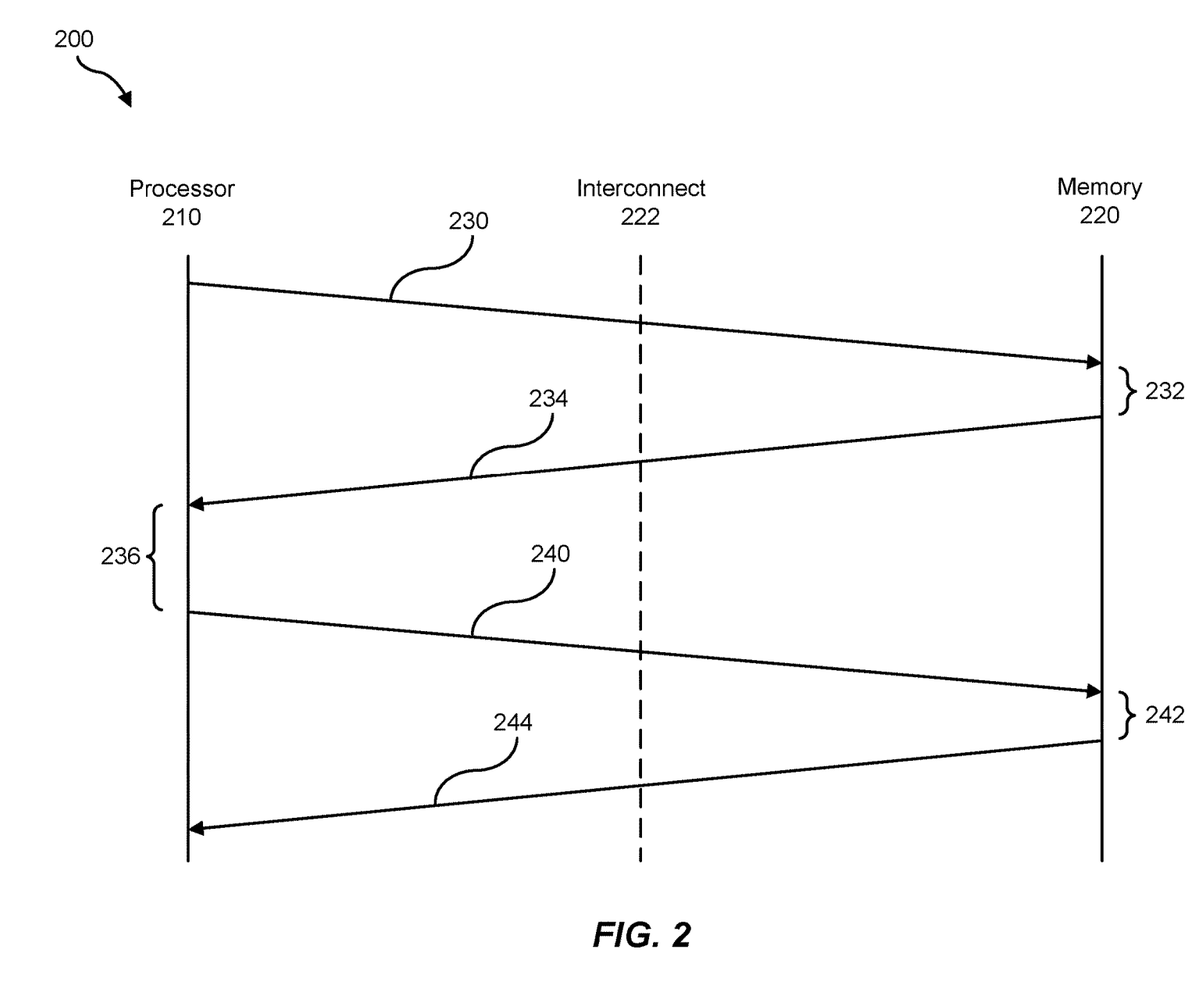
FIG. 2 illustrates an example data flow for data dependent address calculation.

FIG. 2 illustrates a data flow 200 of a timeline for a data dependent load. FIG. 2 includes a processor 210 corresponding to processor 110 and/or a sub-unit thereof, an interconnect 222 corresponding to interconnect 122, and memory 220 corresponding to memory 120. FIG. 2 illustrates an example in which requested data in not available in a cache, such as when first processing a particular data dependent load.

Processor 210 can send a first memory request 230 (e.g., a read request) via interconnect 222 to memory 220. First memory request 230 can correspond to a data dependent load in that the load or requested data includes information needed for determining the next load, such as information for determining a next memory address that contains the next load. In other words, information from a preceding request is required for a following request. Accordingly, a current memory request (e.g., first memory request 230) includes information required for sending a following memory request (e.g., a second memory request 240).

Memory 220 processes first memory request 230 at 232 and returns a first requested data 234 back to processor 210. At 236, processor 210 receives processes first requested data 234, which includes using the information in first requested data 234 to determine a next address for a next load.

Processor 210 sends second memory request 240 for the next load based on the next address. Memory 220 processes second memory request 240 at 242 and sends a second requested data 244 back to processor 210. This end-to-end process can continue for successive data dependent loads. Due to the data dependent loads, processor 210 cannot normally send, for example, pre-fetching instructions or otherwise predict the next memory address.

Figure 3:
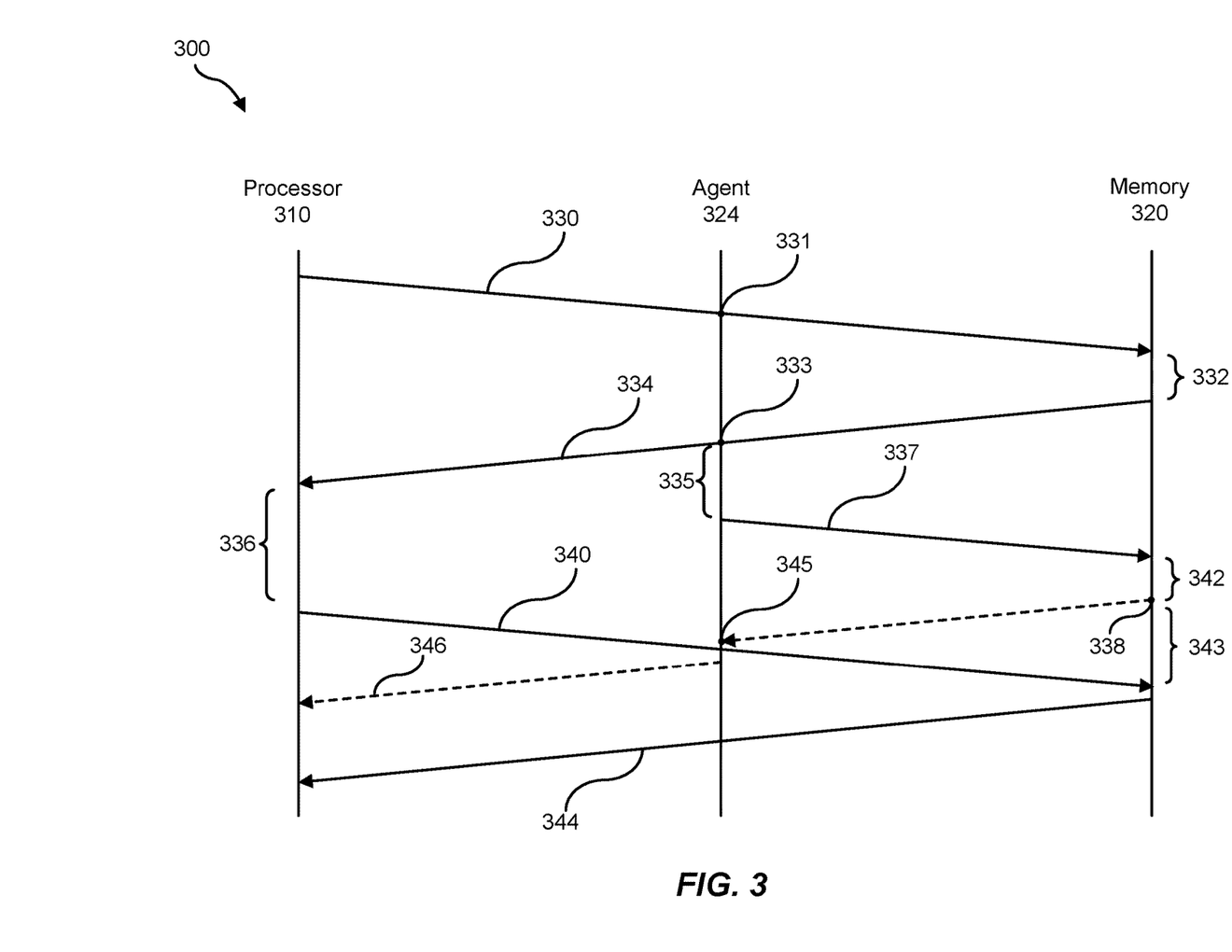
FIG. 3 illustrates an example data flow for data dependent address calculation using remote acceleration.

FIG. 3 illustrates a data flow 300 of a timeline for a data dependent load using remote acceleration. FIG. 3 includes a processor 310 corresponding to processor 110 and/or a sub-unit thereof, an agent 324 corresponding to interconnect circuit 124 and along an interconnect (such as interconnect 122) or in a cache hierarchy (such as cache 114), and memory 320 corresponding to memory 120. FIG. 3 illustrates an example in which requested data in not available in a cache, such as when first processing a particular data dependent load.

Processor 310 can send a first memory request 330 (e.g., a read request) via the interconnect and forwarded by agent 324 to memory 320. First memory request 330 can correspond to a data dependent load. Accordingly, a current memory request (e.g., first memory request 330) includes information required for sending a following memory request (e.g., a second memory request 340). Processor 310 can identify first memory request 330 as corresponding to the data dependent load, for instance by recognizing an instruction address load which generated first memory request 330 as corresponding to the data dependent load. In some examples, the instruction address load can correspond to a linked list or a page table or any other data dependent load.

Based on recognizing first memory request 330 as corresponding to the data dependent load, processor 310 can send a speculative memory request instruction 331 to agent 324 along with first memory request 330. Speculative memory request instruction 331 can include instructions, using information in a first requested data 334, for calculating a next memory address for second memory request 340. Such instructions can include, for example, a location in first requested data 334 to find the next memory address, how to translate the next memory address from requested data 334, etc. In other examples, processor 310 can include instructions for agent 324 based on flags or other information extracted from previously returned data, as described further herein.

Memory 320 processes first memory request 330 at 332 and returns first requested data 334, forwarded by agent 324, back to processor 310. In response to speculative memory request instruction 331, at 333 agent 324 reads first requested data 334 and calculates at 335, using the instructions provided in speculative memory request instruction 331. Accordingly, agent 324 determines and sends a speculative memory request 337 to memory 320 while requested data 334 is forwarded and received by processor 310.

At 336, processor 310 receives and processes first requested data 334, which includes using the information in first requested data 334 to determine a next address for a next load. While processor 310 processes first requested data 334 at 336, memory 320 receives and processes speculative memory request 337 at 342 to retrieve a speculative request data 338. In some examples, memory 320 can safely process speculative memory request 337 because agent 324 (e.g., as part of the interconnect rather than another processing unit or as part of another explicit memory request) sent the request. In other words, agent 324 can be in compliance with any security protocols between processor 310 and memory 320. In some implementations, memory 320 can treat speculative memory request 337 as another memory request.

At 343, memory 320 can store speculative request data 338 in a buffer until receiving a specific request for it (e.g., second memory request 340), although in some implementations memory 320 can drop speculative request data 338 from the buffer after a timeout period elapses. When processor 310 sends second memory request 340 that corresponds to speculative memory request 337 (e.g., by requesting the same data or data from the same address), memory 320 can send speculative request data 338 as a second requested data 344 back to processor 310. As illustrated in FIG. 3, memory 320 can pre-emptively (and speculatively) retrieve second requested data 344 while processor 310 prepares second memory request 340 in order to reduce an overall time needed for retrieving second requested data 344.

In another implementation, agent 324, instead of or in addition to memory 320, can buffer speculative request data 338 such that after retrieving speculative request data 338, memory 320 forwards speculative request data 338 to agent 324 for buffering at 345. In response to second memory request 340, agent 324 can return speculative request data 338 as a second requested data 346 without needing to forward second memory request 340 to memory 320. As illustrated in FIG. 3, having agent 324 buffer speculative request data 338 can, in some examples, further reduce the overall time needed for retrieving second requested data 346. Moreover, in some examples, agent 324 can also drop speculative request data 338 from its buffer after a timeout period elapses.

Although not shown in FIG. 3, second memory request 340 can also include a speculative memory request instruction for agent 324 as needed. Further, although not shown in FIG. 3, in other implementations agent 324, instead of or in addition to processor 310, can recognize memory requests for data dependent loads and accordingly act (e.g., without explicit instruction from processor 310) by reading requested data, calculating next addresses, and sending speculative memory requests as needed.

Figure 4A:
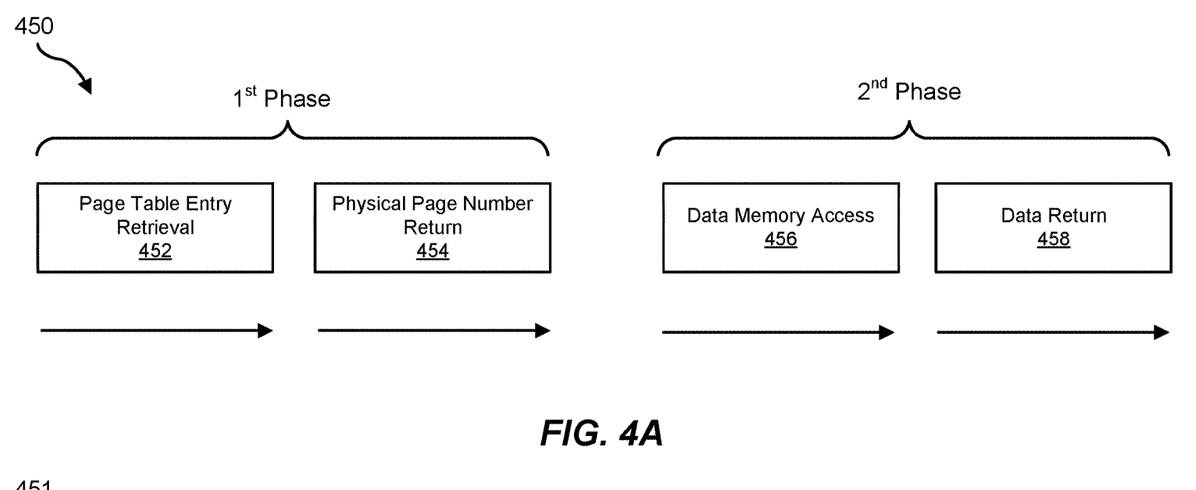
FIGS. 4A-B illustrate example timelines of a memory access after a translation lookaside buffer (TLB) miss.
Figure 4B:
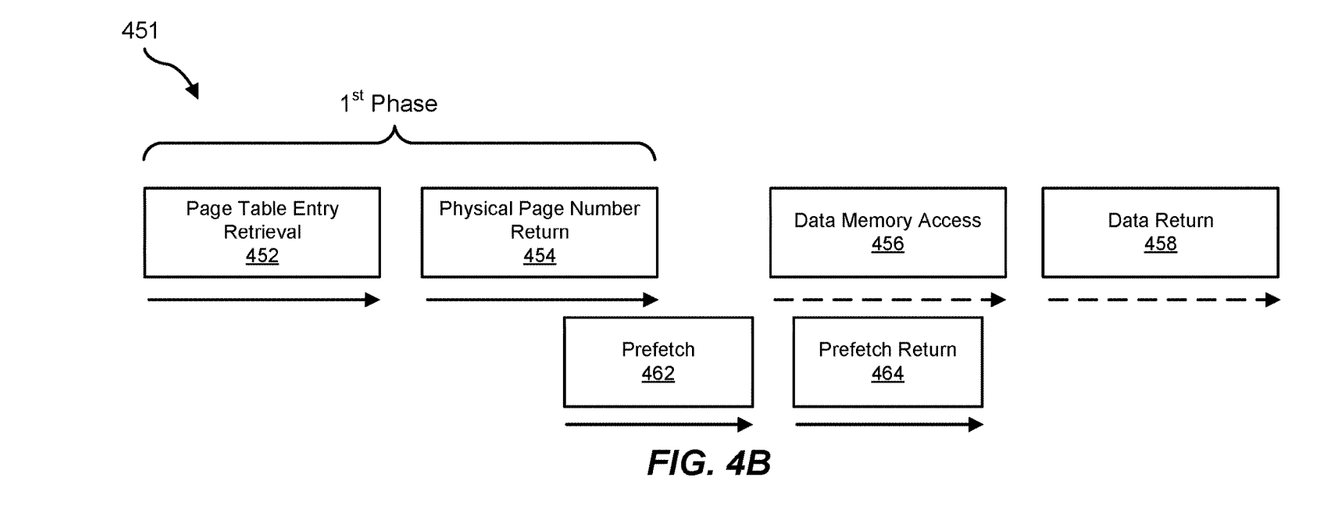

FIGS. 4A-4B illustrate a timeline 450 and a timeline 451, respectively, of translation lookaside buffer (TLB) misses, which can correspond to memory requests as described herein. An address translation cache such as a TLB, which in some implementations can be part of cache 114 and/or reside between cache 114 and memory 120, can maintain translations of virtual addresses (e.g., memory addresses based on an abstract representation of physical memory) to physical addresses (e.g., addresses of the physical memory, such as memory 120), which are often maintained by levels of page tables. Each entry of a page table can point to a next level page table or a physical address (e.g., a physical page number).

Processor 110 can issue a memory request (e.g., a memory access) for a particular virtual address, which includes a first phase of translating the virtual address to a physical address, and a second phase of performing the memory request with the translated physical address (which in some cases can be a replay of the memory access). As illustrated in FIG. 4A, the first phase (which in some examples can correspond to first memory request 230 in FIG. 2) can include a page table entry retrieval 452 corresponding to page table walking in which the various levels of page tables are traversed. For instance, memory 120 can include various page tables corresponding to the various levels, and entries within a page table can point to a next level page table such that page table walking can require multiple memory accesses. At a last level of page table walking (e.g., reaching the last level of page tables, or reaching a page table having a page size corresponding to the last level) the corresponding physical page number is retrieved from memory 120 for a physical page number return 454. Physical page number return 454 can include, in some examples, filling missing entries for the cache levels of cache 114.

To complete the memory request, processor 110 (e.g., cache 114 and/or a controller thereof) can replay the memory access using the physical page number in the second phase, as illustrated in FIG. 4A. The second phase (which in some examples can correspond to second memory request 240 in FIG. 2), includes a data memory access 456 of accessing memory 120 using the physical page number, which often includes cache misses throughout the cache hierarchy of cache 114 before accessing memory 120, followed by a data return 458 of the requested data from memory 120, which can include filling the missing entries in the cache hierarchy.

However, as described above, consecutively accessing memory 120 can incur latency. With respect to a TLB miss, the replay memory access always follows, as described in FIG. 4A. Thus, to reduce latency, the replay can be initiated before completing physical page number return 454, as illustrated in FIG. 4B.

Figure 5:
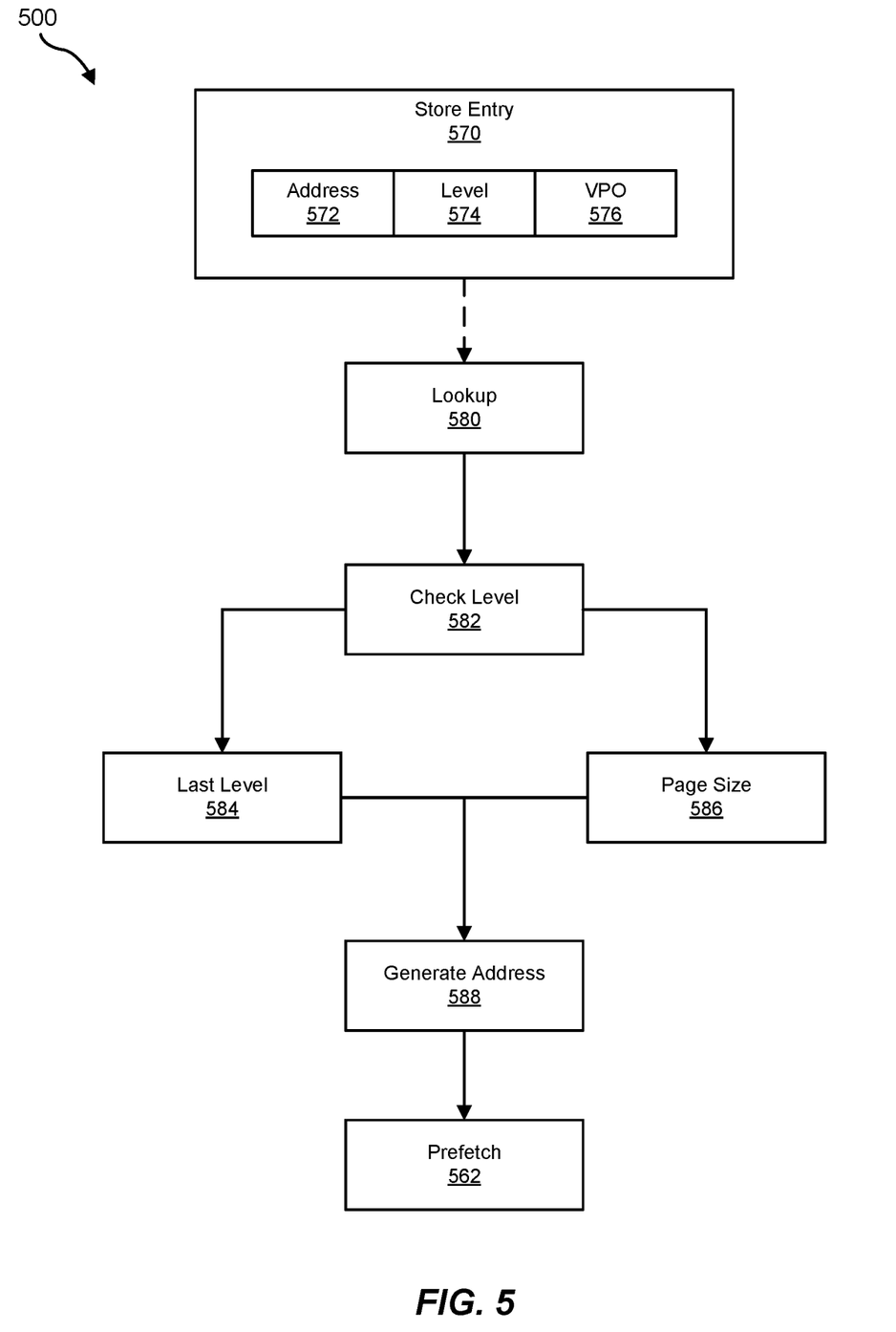
FIG. 5 illustrates an example flow diagram of remote operations performed after a TLB miss operation.

In FIG. 4B, interconnect circuit 124 can receive requested data from memory 120 for each level of page table walking. However, for the last level of page table walking, interconnect circuit 124 can identify, based on additional information received with the requested data, that the requested data corresponds to the physical page number. Interconnect circuit 124 can pre-emptively initiate the replay, for instance by issuing a prefetch 462 before physical page number return 454 completes. A prefetch return 464 can follow prefetch 462 for returning the prefetched data from memory 120, which can include filling at least a highest level cache of cache 114. Further, as data memory access 456 proceeds, prefetch 462 and/or prefetch return 464, can proceed in parallel to reduce overall latency (e.g., by overlapping the latency for filling the cache hierarchy with the physical page number as part of physical page number return 454, issuing the replay as part of data memory access 456, and processing through the cache misses in the levels of the cache hierarchy as part of data return 458). FIG. 5 further illustrates how interconnect circuit 124 can, in some examples, issue prefetch 462.

FIG. 5 illustrates a flow diagram 500 of a data flow as performed by a hardware circuit corresponding to interconnect circuit 124 that operates depending on encoded information in the returned data. In some examples, flow diagram 500 can correspond to operations in an agent to detect a last level of page table walking for a TLB miss, as described above. During a page table walk operation, as can be performed by a controller such as control circuit 112, control circuit 112 can send/forward a memory request/access (e.g., for memory 120) to interconnect circuit 124.

Control circuit 112 can send an address 572 (e.g., an address of the request) and can further send information, such as status flags indicating whether the data corresponds to a translation, a level 574 of the translation (e.g., level of page table walking), along with information/instructions for calculating an address (e.g., a virtual page offset (VPO) 576). In response to the status flags indicating a translation, at a store entry stage 570, interconnect circuit 124 can store the received request and information (e.g., address 572, level 574, and VPO 576, although in other examples can include additional or different information) in a memory device such as a content-addressable memory (CAM). In some implementations, an operating system can also instruct interconnect circuit 124 to store particular addresses and/or address ranges along with corresponding information in the CAM, such that interconnect circuit 124 can preload the CAM.

Upon receiving data back from memory 120 (e.g., as requested by control circuit 112), at a lookup stage 580 (which in some examples can occur before the requested data is returned to control circuit 112), interconnect circuit 124 can look up an address of the returned data in the CAM, which if found (e.g., address 572), indicates the returned data is part of a translation. In other words, the address of the returned data corresponds to an address previously requested (and stored in the CAM) as part of the translation, at store entry stage 570. In some examples, at least some of the information previously sent by control circuit 112 can be propagated to memory 120 as part of the memory request and returned along with the requested data. For instance, a status flag can indicate the translation, such that interconnect circuit 124 can forego looking up the address.

At a check level stage 582, interconnect circuit 124 can determine whether the returned data corresponds to a last level retrieval for the translation (e.g., last level of page table walking). For example, at a last level stage 584, interconnect circuit 124 can determine whether level 574 indicates the last level. Alternatively, at a page size stage 586, interconnect circuit 124 can check a page size encoded in the returned data as corresponding to a last level page size.

In response to confirming the last level retrieval, at a generate address stage 588, interconnect circuit 124 can generate a physical address corresponding to the final translated physical address. For example, interconnect circuit 124 can calculate a physical page number using the returned data, and in some examples, VPO 576. At a prefetch stage 562 (corresponding to prefetch 462), interconnect circuit 124 can initiate the prefetch (e.g., corresponding to a speculative memory request in some examples) using the generated final physical address. Thus, as described herein, interconnect circuit 124 can initiate the prefetch without waiting for control circuit 112 to receive the returned data (which can include updating the cache hierarchy of cache 114 as needed), calculate the final physical address, and send the replay request with the final physical address.

Figure 6:
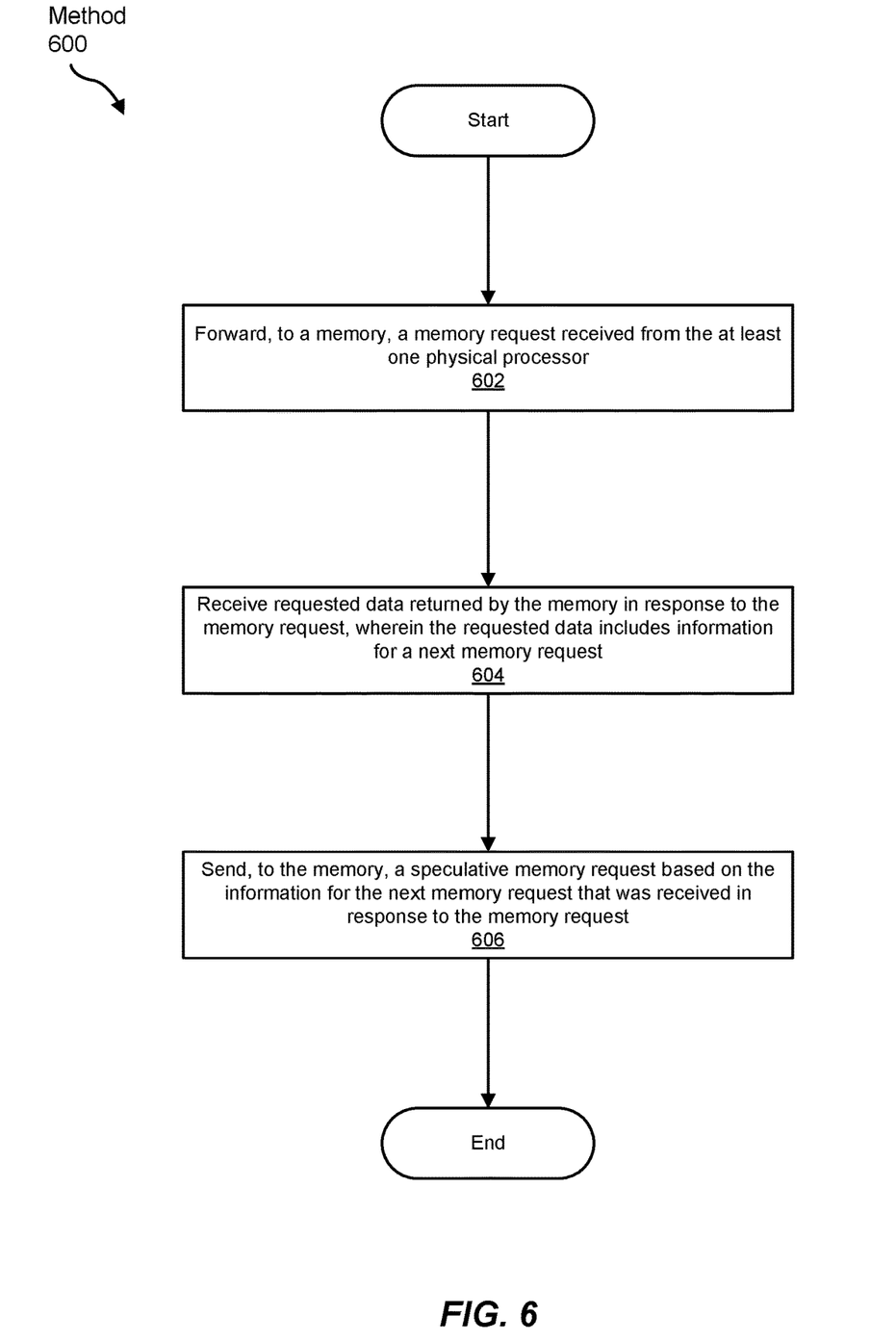
FIG. 6 is a flow diagram of an exemplary method for remote acceleration for data dependent address calculation.

FIG. 6 is a flow diagram of an exemplary computer-implemented method 600 for remote acceleration for data dependent address calculation. The steps shown in FIG. 6 can be performed by any suitable computer-executable code and/or computing system, including the system(s) illustrated in FIGS. 1 and/or 3. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein forwards, to memory, a memory request received from at least one processor. For example, interconnect circuit 124 can forward to memory 120, a memory request received from processor 110 and/or a sub-unit thereof.

The systems described herein can perform step 602 in a variety of ways. In one example, processor 110 (and/or control circuit 112) can identify the memory request as corresponding to a data dependent load that requires information from a current memory request for sending a following memory request. In some examples, control circuit 112 can identify the memory request as corresponding to the data dependent load by recognizing an instruction address load for the memory request. For example, the instruction address load can correspond to a linked list, a page table, and/or any other data dependent load or workload having data dependent address calculation.

In response to identifying the data dependent load, processor 110 can send to interconnect circuit 124, a speculative memory request instruction with the memory request. In some examples, the speculative memory request instruction includes instructions for calculating, using the information in the requested data, a next memory address for the next memory request.

At step 604 one or more of the systems described herein receives requested data returned by the memory in response to the memory request, wherein the requested data includes information for a next memory request. For example, interconnect circuit 124 receives the requested data from memory 120.

The systems described herein can perform step 604 in a variety of ways. In one example, interconnect circuit 124 can forward the requested data back to processor 110. In some implementations, the information can include information on one or more operations to be performed. In some examples, the operations can be selected based on the flags embedded in the requested/returned data.

At step 606 one or more of the systems described herein sends, to the memory, a speculative memory request based on the information for the next memory request that was received in response to the memory request. For example, interconnect circuit 124 sends a speculative memory request to memory 120 based on information in the requested data.

The systems described herein can perform step 606 in a variety of ways. In some examples, interconnect circuit 124 can determine a next operation (which can include one or more operations such as one or more memory requests) based on the information associated with the memory requests or with the returned/requested data (e.g., embedded flags) as well as recorded history (e.g., previous operations, which in some examples can be embedded in or otherwise reflected in the embedded flags/information of the requested data). The information and flags can correspond to, for example, virtual page offset, translation level, instruction received with the original memory request, etc.

In some examples, interconnect circuit 124 generates and sends the speculative memory request (which can include more than one speculative memory request) in response to receiving the speculative memory request instruction. For instance, interconnect circuit 124 can use the instructions in the speculative memory request instruction to determine the next memory address from the requested data. Memory 120 can, in response to receiving the speculative memory request from interconnect circuit 124, retrieve speculative request data.

In some implementations, memory 120 can store, in a buffer (e.g., a buffer of memory 120), the speculative request data. Memory 120 can send the speculative request data in response to a second memory request (e.g., from processor 110) corresponding to the speculative memory request. In some examples, interconnect circuit 124 can receive the speculative request data from memory 120 in response to the speculative memory request and forward the speculative request data to processor 110. In some examples, memory 120 can drop the speculative request data after a timeout period elapses.

In some implementations, interconnect circuit 124 can, in response to receiving the speculative request data from memory 120 store the speculative request data in a buffer (e.g., a buffer of interconnect circuit 124 and/or controlled by interconnect circuit 124). Interconnect circuit 124 can send the speculative request data in response to a second memory request (e.g., from processor 110) corresponding to the speculative memory request. In some examples, interconnect circuit 124 can drop the speculative request data after a timeout period elapses.

Figure 7:
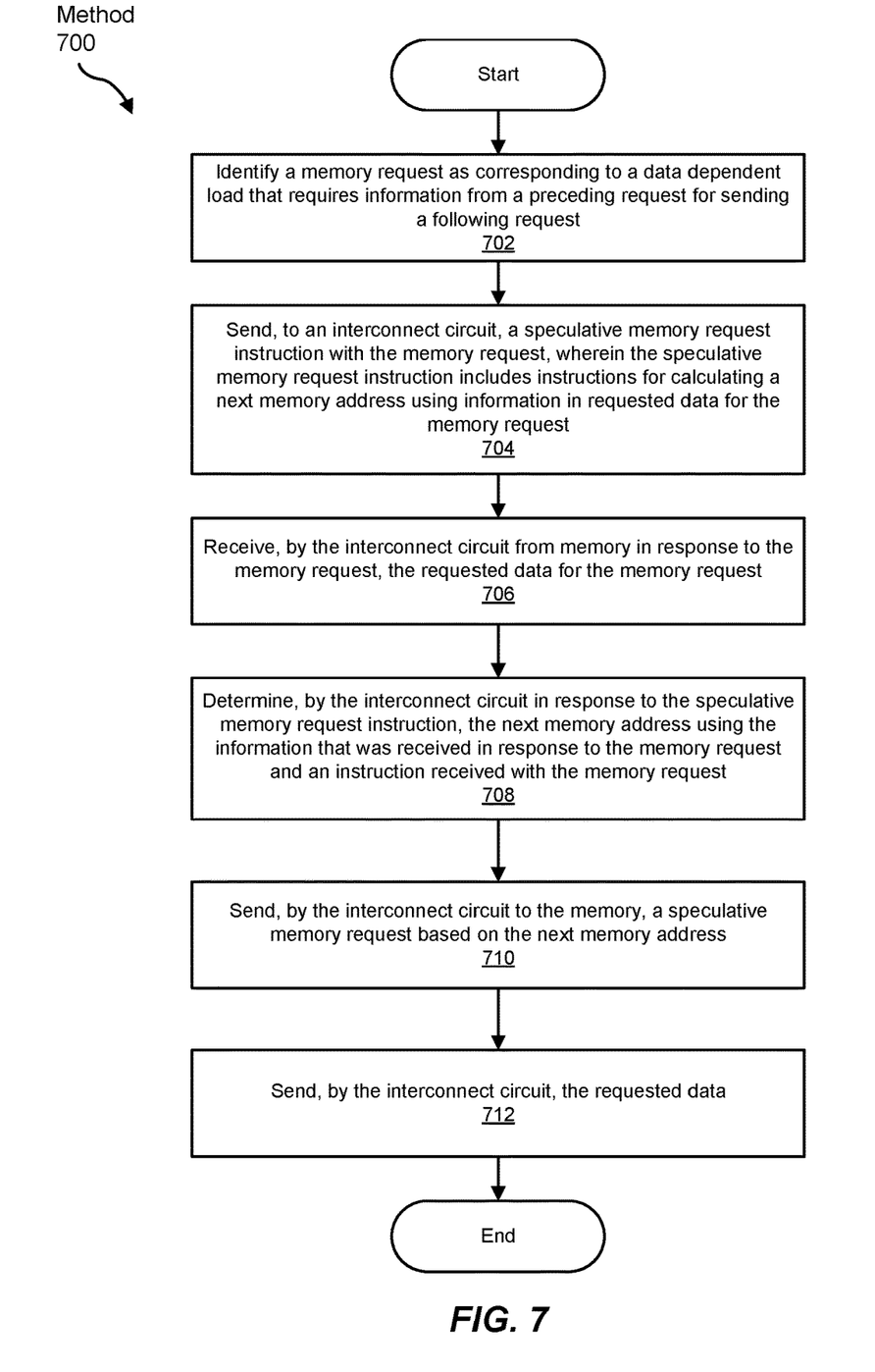
FIG. 7 is a flow diagram of another exemplary method for remote acceleration for data dependent address calculation.

FIG. 7 is a flow diagram of an exemplary computer-implemented method 700 for remote acceleration for data dependent address calculation. The steps shown in FIG. 7 can be performed by any suitable computer-executable code and/or computing system, including the system(s) illustrated in FIGS. 1 and/or 3. In one example, each of the steps shown in FIG. 7 represent an algorithm whose structure includes and/or is represented by multiple sub-steps, examples of which will be provided in greater detail below.

As illustrated in FIG. 7, at step 702 one or more of the systems described herein identifies a memory request as corresponding to a data dependent load that requires information from a preceding request for sending a following request. For example, control circuit 112 can identify a memory request as corresponding to a data dependent load.

The systems described herein can perform step 702 in a variety of ways. In some examples, identifying the memory request as corresponding to the data dependent load includes recognizing an instruction address load for the memory request.

At step 704 one or more of the systems described herein send, to an interconnect circuit, a speculative memory request instruction with the memory request, wherein the speculative memory request instruction includes instructions for calculating a next memory address using information in requested data for the memory request. For example, control circuit 112 can send a speculative memory request instruction with the memory request to interconnect circuit 124.

At step 706 one or more of the systems described herein receive, by the interconnect circuit from memory in response to the memory request, the requested data for the memory request. For example, interconnect circuit 124 can receive the requested data from memory 120.

At step 708 one or more of the systems described herein determine, by the interconnect circuit in response to the speculative memory request instruction, the next memory address using the information that was received in response to the memory request and an instruction received with the current memory request. For example, interconnect circuit 124 can determine the next memory address using the information received in response to the memory request.

At step 710 one or more of the systems described herein send, by the interconnect circuit to the memory, a speculative memory request based on the next memory address. For example, interconnect circuit 124 can send a speculative memory request to memory 120.

The systems described herein can perform step 710 in a variety of ways. In some examples, method 700 further includes retrieving, by the memory, speculative request data in response to the speculative memory request, and buffering the speculative request data. In some examples, method 700 also includes sending the speculative request data in response to a second memory request corresponding to the speculative memory request.

At step 712 one or more of the systems described herein send, by the interconnect circuit, the requested data. For example, interconnect circuit 124 can forward the requested data (e.g., to cache 114, control circuit 112, and/or processor 110).

As detailed above, data dependent loads (such as a pointer chase or a page table walk) are slow in part because they are serialized at the end point (e.g., CPU core). Each load goes from LS to memory and back before the next load can be issued. The high latency of a series of such loads reduces the performance of the application. For instance, when traversing a linked list or when traversing the page table to acquire a new virtual address translation, the next load address requires the current load for calculating such that prefetching techniques are not normally applicable.

The systems and methods described herein allow delegation of the next-address calculation out into the interconnect, where a read response can be intercepted and used to calculate the next load address (using, for example, information send by the CPU core with the original request). The new agent in the interconnect then issues a speculative read to memory to start getting the next target cache line. This can accelerate the sequence by allowing some temporal overlap of these previously serialized operations.

Coherence and permission issues can be avoided by using speculative DRAM reads instead of normal fill requests. This type of transaction is fire-and-forget from the issuer and can be dropped for any reason in the interconnect and/or at the endpoint. The next address calculation is handled, in some examples, by sending base+scale in the original load fill request, along with an offset showing where to look within the line to find the next address. Address translation can either be trivial (skip if not same page or huge page as previous address) or complex (remote translation). In some examples, the agent can receive a message to invalidate its buffer entries from a coherence manager.

The systems and methods described herein can improve overall performance by speeding up data dependent load sequences like pointer chases and page table walks which are user and system memory accesses. The systems and methods can also improve performance of the interaction between user and system memory accesses (e.g., memory access replays after address translation misses). These types of sequences can be performance limiters, especially for cache misses that require going all the way to memory and back for each load before starting the next one.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "processor" generally refers to any type or form of hardware-implemented processing unit capable of interpreting and/or executing computer-readable instructions. In one example, a processor accesses and/or modifies one or more modules stored in the above-described memory device. Examples of processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a processor including a cache;
an interconnect for connecting the cache to memory; and
an interconnect circuit coupled between the processor and the memory and configured to:
send, to the memory, a memory request received from the processor;
receive requested data returned by the memory in response to the memory request, wherein the requested data includes data for identifying a next memory request; and
send, to the memory, a speculative memory request based on the data for identifying the next memory request that was received in response to the memory request.

2. The device of claim 1, wherein:
the processor is configured to:
identify the memory request as corresponding to a data dependent load that requires information from a preceding request for sending a following request; and
send, to the interconnect circuit, a speculative memory request instruction with the memory request; and
the interconnect circuit is configured to send the speculative memory request in response to receiving the speculative memory request instruction.

3. The device of claim 2, wherein the speculative memory request instruction includes instructions for calculating, using the information in the requested data, a next memory address for the next memory request.

4. The device of claim 2, wherein identifying the memory request as corresponding to the data dependent load comprises recognizing an instruction address load for the memory request.

5. The device of claim 1, wherein the interconnect circuit is further configured to:
receive, from the memory, speculative request data in response to the speculative memory request; and
store, in a buffer, the speculative request data.

6. The device of claim 5, wherein the interconnect circuit is further configured to send, to the processor, the speculative request data in response to a second memory request corresponding to the speculative memory request.

7. The device of claim 5, wherein the interconnect circuit is configured to drop the speculative request data after a timeout period elapses.

8. The device of claim 1, wherein:
the requested data includes embedded flags and information for selecting an operation; and
the interconnect circuit is further configured to determine a next operation for the speculative memory request using the requested data and recorded history of previous operations.

9. A system comprising:
a processor including a cache;
memory;
an interconnect for connecting the cache to the memory; and
an interconnect circuit coupled between the processor and the memory and configured to:
receive requested data returned by the memory in response to a memory request from the processor, wherein the requested data includes data for identifying a next memory request and the requested data includes embedded flags for selecting operations;
send, to the processor, the requested data;
determine a next operation using the data for identifying the next memory request and recorded history of previous operations;
calculate, using the data for identifying the next memory request, a next memory address for the next memory request; and
send, to the memory, a speculative memory request based on the next memory address that was received in response to the memory request.

10. The system of claim 9, wherein:
the processor is configured to:
identify the memory request as corresponding to a data dependent load that requires information from a preceding request for sending a following request; and
send, to the interconnect circuit with the memory request, a speculative memory request instruction that includes instructions for calculating, using the information in the requested data, the next memory address; and
the interconnect circuit is configured to send the speculative memory request to the memory in response to receiving the speculative memory request instruction.

11. The system of claim 10, wherein identifying the memory request as corresponding to the data dependent load comprises recognizing an instruction address load for the memory request.

12. The system of claim 11, wherein the instruction address load corresponds to a linked list or a page table.

13. The system of claim 9, wherein the requested data includes a status flag indicating a last level of a page table walk operation.

14. The system of claim 9, wherein the memory is configured to:
retrieve speculative request data in response to the speculative memory request; and
store, in a buffer, the speculative request data.

15. The system of claim 14, wherein the memory is further configured to send the speculative request data to the interconnect circuit in response to a second memory request corresponding to the speculative memory request.

16. The system of claim 14, wherein the memory is configured to drop the speculative request data after a timeout period elapses.

17. A method comprising:
identifying a memory request as corresponding to a data dependent load that requires information from a preceding request for sending a following request;
sending, to an interconnect circuit, a speculative memory request instruction with the memory request, wherein the speculative memory request instruction includes instructions for calculating a next memory address using information in requested data for the memory request;
receiving, by the interconnect circuit from memory in response to the memory request, the requested data for the memory request;

determining, by the interconnect circuit in response to the speculative memory request instruction, the next memory address using the information that was received in response to the memory request and an instruction received with the memory request;

sending, by the interconnect circuit to the memory, a speculative memory request based on the next memory address; and sending, by the interconnect circuit, the requested data.

18. The method of claim 17, further comprising:

retrieving, by the memory, speculative request data in response to the speculative memory request; and buffering the speculative request data.

19. The method of claim 18, further comprising sending the speculative request data in response to a second memory request corresponding to the speculative memory request.

20. The method of claim 17, wherein identifying the memory request as corresponding to the data dependent load comprises recognizing an instruction address load for the memory request.

\* \* \* \* \*